United States Patent [19]

Ziobrowski

[11] 4,247,338
[45] Jan. 27, 1981

[54] METAL CHROMATE PIGMENT COMPOSITIONS

[75] Inventor: Bernard G. Ziobrowski, Glens Falls, N.Y.

[73] Assignee: Ciba-Geigy Corporation, Ardsley, N.Y.

[21] Appl. No.: 962,597

[22] Filed: Nov. 21, 1978

[51] Int. Cl.$^3$ .................................................. C09C 1/20
[52] U.S. Cl. .................................... 106/298; 106/302; 106/308 B; 106/308 F; 106/308 Q
[58] Field of Search ................ 106/298, 302, 308 Q, 106/308 F; 260/42.14, 42.15, 42.44, 42.57

[56] References Cited

U.S. PATENT DOCUMENTS

| | | | |
|---|---|---|---|
| 2,184,539 | 12/1939 | Wiggam | 106/298 |
| 3,470,007 | 9/1969 | Linton | 106/298 |
| 3,909,488 | 9/1975 | Consoli | 260/42.57 |
| 3,973,982 | 10/1976 | Bingham | 106/298 |
| 4,115,143 | 9/1978 | Batzar | 106/298 |

FOREIGN PATENT DOCUMENTS

| | | | |
|---|---|---|---|
| 2425238 | 12/1974 | Fed. Rep. of Germany | 106/298 |
| 1449055 | 8/1976 | United Kingdom | 106/298 |

*Primary Examiner*—Brian E. Hearn
*Attorney, Agent, or Firm*—Harry Falber

[57] ABSTRACT

Metal chromate and particularly lead chromate pigment compositions exhibiting low dusting characteristics and improved heat stability in thermoplastics are described. The pigment compositions consist essentially of a metal chromate-containing pigment and the combination of certain fatty acid salts with normally liquid ester plasticizers. Lead chromate pigment compositions containing the combination of a zinc salt of a fatty acid with benzoate, phthalate, stearate or phosphate plasticizers are particularly preferred and exhibit reduced dusting as well as outstanding advantages in heat stability not realizable with either the fatty acid salt or plasticizer alone or by silica encapsulation of the pigment particles.

9 Claims, No Drawings

METAL CHROMATE PIGMENT COMPOSITIONS

This invention relates to metal chromate-containing pigments and more particularly to pulverulent metal chromate-containing pigments having improved resistance to dusting and improved heat stability in thermoplastic systems, and to a process for their manufacture.

The metal chromate-containing pigments, of which the lead chromate pigments are the most widely known, are relatively inexpensive to manufacture, have good tinctorial properties and are available in a broad spectrum of shades ranging from a very green shade yellow to orange and yellowish red colors. The lead chromate-containing pigments, however, have certain notable deficiencies, outstanding of which are the tendency of the pigments to darken and to react with and/or oxidize thermoplastic resins in which they are incorporated as colorants during processing. In fact, it is well recognized that lead chromate pigments cannot be used to color thermoplastic resins such as polyethylene, polypropylene and polystyrene resins which are processed at temperatures above about 200° C. without serious darkening of the resin, and that the darkening becomes more pronounced as the temperature is further elevated.

Further, for reasons of economy, the metal chromate pigments and particularly the lead chromate pigments are generally produced and used in a pulverized powdery form which is dusty and requires careful handling to avoid contamination. The problem of handling dusty materials is of general concern to environmentalists but becomes a matter of particular concern when dealing with chemicals such as pigments. Thus, there exists a serious need for a method of treating metal chromate pigments and particularly the lead chromate pigments to reduce dusting and improve their heat stability in thermoplastic resins without detracting from their high tinctorial properties and dispersibility characteristics, and thus enhance their general utility as colorants.

One method which has been proposed to overcome the chemical and thermal deficiencies of the lead chromate pigments is described by Linton in U.S. Pat. No. 3,370,971 and involves coating lead chromate pigments with from 2 to 40% of dense amorphous silica deposited as a continuous coating on the pigment particles from an aqueous solution of "active" silica at a pH above 6. The silica-coated pigments of the type described by Linton perform satisfactorily in some applications but are dusty and usually do not possess sufficient protection after compounding to prevent darkening of thermoplastic resins.

One of the reasons for the unsatisfactory performance of the silica-coated pigments in thermoplastic systems relates to the poor abrasion resistance of the silica coating. In the conventional method for coloring thermoplastic resins with pigments, the dried pigment is mixed with the solid granular resin and the resulting mixture is then subjected to vigorous kneading until homogeneity is obtained. The rigorous requirements of compounding tend to abraid the silica coating on lead chromate pigments, result in a deterioration of the chemical, thermal, and light resistance of the pigment and lead to a darkening of the resin. This shortcoming of silica-coated lead chromate pigments has been recognized by the art and various procedures have been suggested to overcome the difficulty. One such method is proposed by Linton in U.S. Pat. No. 3,639,133 and concerns subjecting the lead chromate pigment particles to intense shear to break up agglomerates prior to coating the particles with the silica. Another method is described by Burgyan et al in U.S. Pat. No. 3,773,535 and is directed to encapsulating the silica-coated pigment particles in polyolefin wax. Still another method is described by Linton in U.S. Pat. No. 3,470,007 and concerns treating the silica-coated pigment particles with certain metal salts of rosin acids or long chain fatty acids to help secure the silica deposition to the pigment particle. Silica-coated pigment particles treated with fatty acid salts have improved abrasion resistance over their non-treated silica-coated counterparts. However, the pigments are dusty and processing conditions must be carefully controlled to prevent dust contamination of the environment, to preserve integrity of the coating and to avoid darkening of the resin.

Another method which has been proposed to improve the heat stability and/or the abrasion resistance of the lead chromate pigments is described in Bingham in U.S. Pat. No. 3,973,982 and involves coating the non-treated or silica encapsulated pigment particles with from about 1 to about 50% by weight of the pigment of an aromatic carboxylic acid or an insoluble metal salt thereof such as the calcium, barium, aluminum or lead salt. Pigment particles which have been coated with isophthalic acid or calcium isophthalate are said to have improved thermal stability over their non-coated counterparts. However, the dusting tendency of the pigment is high and special handling is required to avoid contamination of the atmosphere. Further, conventional, non-silica encapsulated pigments which have been coated with isophthalic acid or calcium isophthalate do not possess as good color and heat stability as the silica-encapsulated lead chromate pigments, and are not satisfactory as colorants for materials which are processed at elevated temperatures.

Further, it has been proposed by Batzar in U.S. Pat. No. 4,115,143 that the handling characteristics of the metal chromate pigments can be improved and that substantially dust-free metal chromate pigments can be obtained by intimately contacting the pigment in aqueous medium with from 2 to 25% by weight of the pigment of normally liquid organic esters of phthalic, terephthalic or fatty acids. Batzar's pigment compositions containing about 8 to 15% by weight of the composition of the organic ester are free-flowing and substantially dustless. However, the thermal stability of conventional, non-silica-coated lead chromate pigments treated in the manner described by Batzar is not as good as the silica-coated version of the pigment and attempts to improve the heat stability by increasing the amount of organic ester yield wet, sticky compositions which are completely unsatisfactory in conventional grinding and compounding equipment and require special processing techniques.

It has also been disclosed in the prior art that the dusting tendencies of pulverulent materials can be avoided by converting the material into tablets or beads by compression or granulation in the presence of resinous granulating agents. Nondusting spherical beads of pigment compositions containing low melting, normally solid resins as granulating agents are described, for example, in British Pat. Nos. 1,178,846 and 1,238,118 and in U.S. Pat. Nos. 4,015,999 and 4,055,439. Beads or spherical granules of compositions which contain large amounts of pigment are more difficult to incorporate in thermoplastic resins than free-flowing pigments in the form of powder and considerably longer blending times are required to achieve adequate color uniformity.

Thus, the effectiveness of the metal chromates and particularly the lead chromate-containing pigments as colorants for thermoplastics would be enhanced if their heat stability, chemical resistance and handling characteristics could be improved without detriment to the desirable properties of the lead chromate pigments or the thermoplastic resins in which they are incorporated.

Now in accordance with the present invention, it has been found that not only can the dusting tendency of pulverulent metal chromate pigments be reduced but that metal chromate-containing pigments having improved heat stability and good dispersibility characteristics can be obtained by treating the pigment particles with the combination of certain metal salts of fatty acids and certain plasticizers which are normally liquid, i.e., liquids at ambient temperatures, e.g., 15° to 25° C. The finding that heat stability and dusting characteristics could be improved in this manner was completely unexpected since similar improvement is not realized with the same amount of either the fatty acid salt or the plasticizer alone.

Accordingly, the present invention relates to a pulverulent metal chromate-containing pigment composition having improved heat stability in plastics and reduced dusting tendency, said composition consisting essentially of, by weight, from 50 to 85% of a metal chromate-containing pigment, from 7.5 to 30% of at least one water-insoluble metal salt of a fatty acid containing at least 12 carbon atoms and from 7.5 to 20% of at least one normally liquid ester plasticizer. The invention also relates to a process for producing the improved pigment compositions by intimately contacting particles of a metal chromate-containing pigment with the above fatty acid salts and plasticizers and recovering the resulting pigment composition.

By the term "pulverulent composition" is meant a composition which is reduced to or is reducible to a fine powder having particles of a size less than about 100 microns and preferably less than about 50 microns. By the terms "metal chromate pigment" and "metal chromate-containing pigment" are meant pigments which include a metal chromate and particularly strontium chromate, zinc chromate or lead chromate, as the major constituent. The lead chromate pigments are preferred and specific lead chromate pigments to which the invention is applicable are the following, all references being to "Colour Index," 2nd edition, 1956, published jointly by the Society of Dyers and Colourists, England, and the American Association of Textile Chemists and Colorists, United States:

Chrome Yellow CI-77600
Basic Lead Chromate CI-77601
Lead Sulfochromate CI-77603
Molybdate Orange or Red CI-77605.

The preferred lead chromates include the very green shade Primrose Yellow in rhombic crystal form; the relatively pure lead chromate which is much redder, is in monoclinic crystal form and is commonly known as "Medium Yellow;" the intermediate shades which are solid solutions of lead chromate and lead sulfate, are usually in monoclinic form and are known as "Light Yellows;" and the series of solid solutions of lead chromate, lead sulfate and lead molybdate in tetragonal or modified monoclinic form, which range in hue from yellowish oranges to deep reds and which are known as "Molybdate Oranges" and "Molybdate Reds".

The metal chromate-containing pigments used in this invention can be in the form of base or incompletely coated pigment particles or, if desired, can be pigment particles which have been after-treated with, for example, dense amorphous silica, with or without alumina to completely coat or encapsulate the particles. The after-treatment by deposition of a dense amorphous type of silica or silica and alumina as a complete coating upon the pigment particles to achieve encapsulation is described in U.S. Pat. No. 3,370,971 to Linton and details of the methods disclosed therein are hereby incorporated by reference. In one embodiment of the present invention a dense silica coating is deposited on the pigment particles by simultaneously but separately adding a sodium silicate solution and a mineral acid or ammonium sulfate or chloride solution to an aqueous slurry of the pigment particles at a pH within the range of about 9.0 to 9.5 and a temperature of at least 60° C. and preferably above 75° C. The quantity of silica calculated as $SiO_2$ which is applied to the pigment particles as dense amorphous silica can vary over a range which will usually be from about 2 to about 40%, preferably from about 5 to about 30% and most preferably from about 15 to about 32% by weight of the coated particles. In a preferred embodiment, the silica coating is dense amorphous silica and the coating also contains a small amount, usually from about 0.2 to about 10%, and preferably from about 1 to about 5% by weight of the coated pigment of alumina deposited as a separate coating thereon. The inclusion of alumina as part of the coating aids in handling of the coated pigment and further enhances the heat stability of the pigment. The deposition of alumina on the silica-coated lead chromate particles is conveniently carried out by adding an aqueous solution of a soluble aluminum compound such as alum or sodium aluminate to the heated aqueous dispersion of the silica-coated lead chromate particles and continuing the agitation until deposition is complete.

The pigment compositions of this invention can be produced in any convenient manner for contacting liquids and finely divided solids. For example, the lead chromate particles, with or without a silica or silica/alumina coating, in the form of ground dried lump, wet cake, a slurry of the pigment in water or a suitable organic diluent, or the pigment slurry resulting from the synthesis or the coating step can be mixed with the fatty acid salt and plasticizer as such, or as a solution or dispersion of each of their combination in water or a suitable organic solvent, and the mixture ground or vigorously agitated at room temperature in a Waring blender, Osterizer or other high speed mixer for from 1 minute to 4 hours or more, and preferably from 5 minutes to about 2 hours. If desired, and such is usually advantageous when working in aqueous medium, the treatment can be carried out in the presence of a small amount, preferably from about 1 to about 5% by weight of the composition of an emulsifying agent such as a nonionic emulsifier of the polyether alcohol type. The fatty acid salt and plasticizer can also be applied directly, as by sprinkling each on the dry pigment and then grinding the wetted pigment in a high speed grinding device. Although the energy requirements of the latter technique are higher, it offers the distinct advantage of reducing dusting while providing a product of increased density. Regardless of the manner in which the fatty acid salt and plasticizer are applied to and contacted with the pigment particles, this step of the process should be carried out under conditions which provide a liquid form of the plasticizer. Usually, the contacting will be at room or slightly elevated temperatures although temperatures up to about 100° C. can be used if desired.

The resulting pigment is recovered conventionally. If the contacting with the fatty acid salt and plasticizer has been conducted using a slurry of the pigment particles, the usual practice is to separate the pigment from the diluent by filtration or evaporation, followed by washing, if desired, and drying at a temperature of 100° C. or below.

The fatty acid salts which are useful in this invention are the water-insoluble metal salts of fatty acids containing at least 12 carbon atoms and preferably 12 to 24 carbon atoms. The preferred salts are the Group IIA, IIB, IIIA and VIII metal salts of the saturated aliphatic monocarboxylic acids containing 12 to 24 carbon atoms and having a melting point range from about 40° to about 90° C. Most preferred are the zinc, aluminum, magnesium and calcium salts of lauric, myristic, pamitic, stearic, arachidic and behenic acid, and mixtures thereof.

The plasticizers employed in this invention are inert, normally liquid, non-volatile esters conventionally known to the art as poly(vinyl chloride) plasticizers. The preferred ester plasticizers have boiling points above about 200° C. A wide variety of ester plasticizers which meet the above requirements are known and particularly useful are the normally liquid esters of fatty acids and saturated monohydric alcohols, the diesters of dicarboxylic acids and saturated monohydric alcohols, the fatty acid or benzoic esters of polyols and the phosphoric acid esters. Preferred plasticizers include the monoesters of fatty acids containing from 12 to 18 carbon atoms in the alkyl group of the fatty acid and from 3 to 8 carbon atoms in the ester alkyl group; the dialkyl-, diaryl-, alkylaryl- or alkylaralkyl- esters of aromatic or saturated aliphatic dicarboxylic acids; the tetraacyl esters of pentaerythritol; the benzoic acid esters of glycols; and the triesters of phosphoric acid wherein the organic substituents are alkyl, alkoxyalkyl, aryl, or alkaryl groups. Typical plasticizers include butyl stearate, dibutylphthalate, the dioctylphthalates, butyloctylphthalate, n-octyl-n-decylphthalate, butylbenzylphthalate, dibutyladipate, diisooctyladipate, di-2-ethylbutyl azelate, dibutyl sebacate, dioctyl sebacate, the pentaerythritol tetraester of mixed $C_4$ to $C_9$ acids, pentaerythritol tetrastearate, diethylene glycol dibenzoate, tributylphosphate, cresyl diphenylphosphate, tricresylphosphate, 2-ethylhexyl diphenylphosphate and tridimethylphenylphosphate.

The amount of fatty acid salt and plasticizer which will provide the advantages of this invention can be varied over a relatively wide range within the recited limits. As stated, as little as about 7.5% based on the total weight of the pigment composition of each results in decided improvement in dust reduction and heat stability, and as the amount of each is increased up to about 18%, the dust reduction of the pigment and resistance to heat degradation are further increased. Amounts above about 20% of the plasticizer and above about 30% of the fatty acid salt, however, have not been found to confer additional advantages and, since they further extend the pigment, thereby decreasing toner value, and also tend to decrease the free-flowing nature of the pigment, are not recommended. In the preferred embodiment, the amount of fatty acid salt will range from 8 to 20%, and more preferably from 8 to 18%, and the amount of plasticizer will range from 8 to 20% and more preferably from 8 to 16%, based on the weight of the composition.

The invention is further illustrated by the following examples in which all parts and percentages are by weight unless otherwise indicated.

EXAMPLE 1

A blender was charged with an aqueous slurry containing 70 parts of medium chrome yellow pigment (CI-77600) to which were added 15 parts of diethylene glycol dibenzoate and 15 parts of zinc stearate, the blender was turned on and the charge was agitated for 10 minutes at high speed. The resulting slurry was dried at 93° C. for 12 hours, and the dried product was pulverized by grinding in an Osterizer. The product contained, by weight, 70% of lead chromate pigment, 15% of diethylene glycol dibenzoate and 15% of zinc stearate and was labeled pigment 1.

Two control pigment compositions were also prepared as above, except that in one case the diethylene glycol dibenzoate was omitted and the amount of zinc stearate was increased to 30 parts (pigment A), and in the other case the zinc stearate was omitted and the amount of diethylene glycol dibenzoate was increased to 30 parts (pigment B).

The pigment composition of this example (pigment 1), the two control pigment compositions (pigments A and B), the starting medium yellow pigment CI-77600 (pigment C) and a commercial silica/alumina encapsulated version of the medium yellow chrome yellow pigment (70% toner, pigment D) were each evaluated in samples of polypropylene at the 2% level by dry blending 2 parts of pigment with 98 parts of commercial polypropylene pellets, passing the blended sample thrice through a Sterling, one inch laboratory extruder at 204° C., and then passing a sample of the extrudate into a set of test chips using a Carver press, a temperature of 204° C. and a dwell time of 60 seconds. Another sample of the extrudate was transferred to a thermostatically controlled heating block and heated for 3 minutes at 302° C. and then the heated sample was removed from the block and pressed into a set of test chips using a Carver press, a temperature of 204° C. and a dwell time of 60 seconds. Heat stability of the test chips was evaluated by visually examining and comparing the test chips of each set, using a rating scale of 1 to 5 to denote color differences due to darkening. On this scale, the integer 1 was assigned to the cleanest chip of each set and the integers 2 to 5 were used to denote the following degrees of darkness.

2—slightly darker than 1
3—appreciably darker than 1
4—notably darker than 1
5—much darker than 1

The chips of the first and second set were also compared and rated in order of degree of change of sample darkening due to elevation of the temperature from 204° C. to 302° C. In this evaluation, the letter "a" was assigned to the pigmented sample which exhibited the least degree of change and the letters "b" to "e" were used to designate the following degrees of change.

b—slightly greater than a
c—appreciably greater than a
d—notably greater than a
e—much greater than a The results of the evaluations are given below in Table I.

The dusting characteristics of the pigment of this example and the four control pigments A-D were also measured and compared. In this test, a weighed quantity of pigment was placed in a small cup mounted to a rotatable shaft near the top of a vertical column having at its base an air inlet and flow regulation means and at its upper end a tubular connector to a millipore filter member and vacuum means. The air flow was adjusted to a standard rate by means of the vacuum and the cup was inverted by rotating the shaft, thereby permitting the pigment to fall through the ascending air stream in the column. Air flow was continued for 60 seconds, after which time the air and vacuum were turned off and the amount of pigment fines collected on the filter was measured qualitatively by visual examination, a highly colored filter member indicating a very dusty pigment and a faintly colored or uncolored filter member indicating a substantially dustfree pigment. In this evaluation a numerical scale ranging from 0 to 5 was used to designate degree of dusting. On this scale, the figure 0 was assigned to a filter with no observable color, 1 to a filter having very faint color, 5 to a highly colored filter and the figures 2 to 4 to filters having intermediate degrees of color between 1 and 5. The results of the dusting evaluation are reported below in Table I.

TABLE I

| Pigmented Polypropylene Sample | Maximum Processing Temperature | | Degree of Darkening | Dusting Evaluation |
|---|---|---|---|---|
| | 204° C. | 302° C. | | |
| pigment 1 | 1 | 1 | a | 0 |
| pigment A | 1 | 2 | b | 5 |
| pigment B* | — | — | — | — |
| pigment C | 3 | 5 | e | 4 |
| pigment D | 1 | 3 | c | 5 |

*pigment "too wet" to test

EXAMPLE 2

An Osterizer blender was charged with 84 parts of a lead chromate pigment of the molybdate orange type (Pigment Red 104, CI-77605), 8 parts of zinc stearate and 8 parts of dioctylphthalate and the charge was blended at high speed for 10 minutes at room temperature. The product of this example (pigment 2) was free-flowing and contained 8% of zinc stearate and 8% of dioctylphthalate based on the product weight.

Two control pigment compositions were also prepared as above except that in one case no zinc stearate was used and the amount of dioctylphthalate was increased to 16 parts (pigment E) and in the other case no dioctylphthalate was used and the amount of zinc stearate was increased to 16 parts (pigment F).

The pigment composition of this example (pigment 2), the two control pigment compositions E and F, and the untreated starting pigment CI-77605 (pigment G) were evaluated for heat stability in polypropylene and for dusting tendency according to the procedure set forth in Example 1. The results of these evaluations are set forth below in Table II.

TABLE II

| Pigmented Polypropylene Sample | Maximum Processing Temperature | | Degree of Darkening | Dusting Evaluation |
|---|---|---|---|---|
| | 204° C. | 302° C. | | |
| pigment 2 | 1 | 1-2 | a | 1 |
| pigment E | 2 | 3 | b-c | 1 |
| pigment F | 2 | 3 | b-c | 5 |
| pigment G | 3 | 5 | e | 5 |

Clearly, the pigment composition of this example provides advantages in both dust reduction and heat stability at 302° C. not realizable with an equivalent amount of either the fatty acid salt or the plasticizer alone.

EXAMPLE 3

A vessel equipped with an agitator and heating means was charged with 200 parts of a commercial, Medium Yellow, monoclinic lead chromate pigment (CI-77600) and 4000 parts of water and the charge was agitated to form a uniform slurry. Sufficient caustic soda was next added to adjust the pH of the slurry to 9.5 and heat was applied to raise and maintain the temperature at 95° C. While continuing agitation, a solution containing 220 parts of water glass (28.5% $SiO_2$; $SiO_2/Na_2O$ ratio of 2.2/1) and 9 parts of caustic soda and a solution containing 32 parts of 94% sulfuric acid were slowly and simultaneously added to the slurry over a period of 3 hours. Agitation was continued for an additional 30 minutes at 95° C. after which time an aqueous solution of 30 parts of hydrated aluminum sulfate (equivalent to 5 parts of $Al_2O_3$) was added and the pH was adjusted to 6.0–6.5 with caustic soda. The product was isolated from the aqueous medium, washed, dried at 82° C. and Raymond milled. The dried product was lead chromate particles having deposited on their surfaces a substantially continuous coating of 23.5% of dense amorphous silica and 1.9% of alumina, based on the dry product weight, and was labeled Pigment I.

An Osterizer blender was charged with 84 parts of the dry silica/alumina coated pigment produced above, 8 parts of commercial grade zinc stearate and 8 parts of tributyl phosphate and the charge was blended at high speed for ten minutes at room temperature, following which time the charge was removed from the blender and the resulting pigment was recovered. The pigmentary product of this example (labeled pigment 3) was free-flowing and contained 8% of zinc stearate and 8% of tributyl phosphate, based on the total weight of the product.

A control pigment composition (pigment H) was also prepared in the same manner as above by charging the Osterizer blender with 84 parts of the silica/alumina coated pigment and 16 parts of tributyl phosphate.

The pigment composition of this example (pigment 3), the control pigment composition (pigment H) and the silica/alumina coated yellow starting pigment (pigment I) were evaluated for heat stability in polypropylene and for dusting tendency according to the procedure set forth in Example 1. The results of these evaluations are set forth below in Table III.

TABLE III

| Pigmented Polypropylene Sample | Maximum Processing Temperature | | Degree of Darkening | Dusting Evaluation |
|---|---|---|---|---|
| | 204° C. | 302° C. | | |
| pigment 3 | 1 | 2 | a | 1 |
| pigment H | 1 | 3 | b | 1 |

TABLE III-continued

| Pigmented Polypropylene Sample | Maximum Processing Temperature 204° C. | 302° C. | Degree of Darkening | Dusting Evaluation |
|---|---|---|---|---|
| pigment I | 2 | 4 | c | 5 |

EXAMPLE 4

A conical blender charged with 350 parts of pulverized Primrose Yellow lead sulfochromate pigment (CI-77603) and 60 parts of ground zinc stearate was rotated for 1 hour, following which time 51 parts of tributyl phosphate was introduced into the charge over a 15 minute period using a spray nozzle fed by a line through the rotation shaft of the blender. Rotation was continued for 4 hours and then the resulting mixture was discharged into drums. The product was a very low dusting color and contained 76% of the lead sulfochromate pigment, 13% of zinc stearate and 11% of tributyl phosphate.

The pigment composition of this example (pigment 4), the starting pigment CI-77603 (pigment J) and a commercial "non-dusting" silica/alumina encapsulated version of Pigment CI-77603 (pigment K) were evaluated for heat stability in polystyrene according to the procedure set forth in Example 1 except that the extrusion and pressing temperature was 193° C. and the block temperature was 274° C. The dusting characteristics were also evaluated according to the procedure set forth in Example 1 and the degree of dusting was measured quantitatively by digesting the filter paper with pigment fines collected thereon in a nitric acid-perchloric acid mixture, diluting the resulting mixture to a measured volume and analyzing for lead by atomic absorption. The results of these evaluations are set forth in Table IV below.

TABLE IV

| Pigmented Polystyrene Sample | Maximum Processing Temperature 193° C. | 274° C. | Degree of Darkening | Dusting Evaluation V(1) | A(2) |
|---|---|---|---|---|---|
| pigment 4 | 1 | 1-2 | a | 0 | 0.03 |
| pigment J | 4 | 5 | c | 5 | 2.3 |
| pigment K | 2 | 3 | b | 1 | 0.07 |

(1)Visual examination using the rating system of Example 1.
(2)Analytical determination of the collected fines, as a percent of test sample weight.

EXAMPLE 5

The procedure of Example 4 was repeated except that 500 parts of medium yellow lead chromate (CI-77600) was substituted for the 350 parts of lead sulfochromate (CI-77603), and 100 parts of zinc stearate and 114 parts of tributyl phosphate were used. The product of this example was very low dusting and contained 70% of the lead chromate pigment, 14% of zinc stearate and 16% of tributyl phosphate.

The pigment composition of this example (pigment 5), the starting lead chromate pigment CI-77600 (pigment L) and a commercial "nondusting" silica/alumina encapsulated version of CI-77600 (pigment M) were evaluated for heat stability in polystyrene according to the procedure of Example 4 and for dusting tendency according to the procedure of Example 1. The results of these evaluations are set forth below in Table V.

TABLE V

| Pigmented Polystyrene Sample | Maximum Processing Temperature 193° C. | 274° C. | Degree of Darkening | Dusting Evaluation |
|---|---|---|---|---|
| pigment 5 | 1 | 1-2 | a | 1 |
| pigment L | 4 | 5 | e | 4 |
| pigment M | 2 | 3 | c | 1 |

The above examples and tables clearly demonstrate that the pigment compositions of this invention provide advantages in both dust reduction and heat stability in thermoplastic resins not realizable with an equivalent amount of either the fatty acid salt or the plasticizer alone or with silica encapsulation and point out the unique advantages which are achievable by the practice of this invention.

What I claim and desire to protect by Letters Patent is:

1. A metal chromate-containing pigment composition in the form of a fine powder having particles of a size less than about 100 microns, improved heat stability in plastics and reduced tendency to dusting said composition consisting essentially of, by weight, from 50 to 85% of a metal chromate-containing pigment selected from the group consisting of chrome yellow, basic lead chromate, lead sulfo-chromate, molybdate orange and molybdate red; from 7.5 to 30% of at least one water-insoluble zinc, aluminum, magnesium or calcium salt of a fatty acid containing at least 12 carbon atoms; and from 7.5 to 20% of at least one normally liquid ester plasticizer selected from the group consisting of esters of fatty acids and saturated monohydric alcohols, diesters of dicarboxylic acids and saturated monohydric alcohols, fatty acid esters of polyols, benzoic acid esters of polyols and phosphoric acid esters.

2. A pigment composition according to claim 1 wherein the metal chromate-containing pigment is selected from the group consisting of chrome yellow, lead sulfo-chromate, molybdate orange and molybdate red.

3. A pigment composition according to claim 1 wherein the salt of the fatty acid is selected from group consisting of the zinc, magnesium or calcium salt of a fatty acid containing 12 to 24 carbon atoms.

4. A pigment composition according to claim 3 wherein the salt of the fatty acid is selected from the group consisting of the zinc, magnesium or calcium salt of a fatty acid selected from the group consisting of lauric, myristic, palmitic, stearic, arachidic and behenic acid and mixtures thereof.

5. A pigment composition according to claim 1 wherein the ester plasticizer is selected from the group consisting of esters of fatty acids and saturated monohydric alcohols, diesters of dicarboxylic acids and saturated monohydric alcohols, fatty acid esters of polyols and benzoic acid esters of polyols.

6. A pigment composition according to claim 2 wherein the salt of the fatty acid is selected from the group consisting of zinc stearate, magnesium stearate, and calcium stearate.

7. A pigment composition according to claim 6 wherein the ester plasticizer is selected from the group consisting of diethylene glycol dibenzoate, dioctylphthalate, tributyl phosphate, isopropyl myristate, and dioctyl adipate.

8. A pigment composition according to claim 1 wherein the metal chromate-containing pigment have on their surfaces a substantially continuous coating of dense amorphous silica or dense amorphous silica and alumina.

9. A process for producing a metal chromate-containing composition in the form of a fine powder having particles of a size less than about 100 microns, improved heat stability in plastics and a reduced tendency to dusting, said process comprising intimately blending dry particles of a metal chromate-containing pigment selected from the group consisting of chrome yellow, basic lead chromate, lead sulfo-chromate, molybdate orange and molybdate red with, based on the total weight of the composition, from 7.5 to 30% of at least one water-insoluble zinc, aluminum, magnesium or calcium salt of a fatty acid containing at least 12 carbon atoms; and from 7.5 to 20% of at least one normally liquid ester plasticizer selected from the group consisting of esters of fatty acids and saturated monohydric alcohols, diesters of dicarboxylic acids and saturated monohydric alcohols, fatty acid esters of polyols, benzoic acid esters of polyols and phosphoric acid esters.

* * * * *